United States Patent
Sumpter

(10) Patent No.: US 9,063,713 B2
(45) Date of Patent: Jun. 23, 2015

(54) GRAPHICS CONTROLLERS WITH INCREASED THERMAL MANAGEMENT GRANULARITY

(75) Inventor: Anthony Graham Sumpter, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1079 days.

(21) Appl. No.: 12/259,964

(22) Filed: Oct. 28, 2008

(65) Prior Publication Data

US 2010/0103147 A1 Apr. 29, 2010

(51) Int. Cl.
*G06F 1/20* (2006.01)

(52) U.S. Cl.
CPC .............. *G06F 1/206* (2013.01); *Y02B 60/1275* (2013.01)

(58) Field of Classification Search
CPC ................ G09G 2310/021; G09G 2310/0267; G06F 1/206
USPC ........................................................ 345/204
See application file for complete search history.

(56) References Cited

U.S. PATENT DOCUMENTS

| | | | |
|---|---|---|---|
| 4,104,523 A | 8/1978 | Wolfert | |
| 4,614,528 A | 9/1986 | Lennen | |
| 4,620,248 A | 10/1986 | Gitzendanner | |
| 4,863,499 A | 9/1989 | Osendorf | |
| 4,982,783 A | 1/1991 | Fickett et al. | |
| 5,025,336 A | 6/1991 | Morehouse et al. | |
| 5,148,337 A | 9/1992 | Cullen et al. | |
| 5,392,177 A | 2/1995 | Chainer et al. | |
| 5,440,172 A | 8/1995 | Sutrina | |
| 5,781,768 A | 7/1998 | Jones, Jr. | |
| 5,905,636 A | 5/1999 | Baska et al. | |
| 5,963,200 A | 10/1999 | Deering et al. | |
| 6,076,171 A | 6/2000 | Kawata | |
| 6,143,058 A | 11/2000 | Dahlgren et al. | |
| 6,243,656 B1 | 6/2001 | Arai et al. | |
| 6,286,212 B1 | 9/2001 | Eaton | |
| 6,407,595 B1 | 6/2002 | Huang et al. | |
| 6,462,410 B1 | 10/2002 | Novotny et al. | |
| 6,504,243 B1 | 1/2003 | Andric et al. | |
| 6,515,716 B1 | 2/2003 | Suzuki et al. | |
| 6,535,208 B1 | 3/2003 | Saltchev et al. | |
| 6,557,065 B1 | 4/2003 | Peleg et al. | |
| 6,624,816 B1 * | 9/2003 | Jones, Jr. ...................... | 345/503 |
| 6,687,320 B1 | 2/2004 | Chiu et al. | |
| 6,778,387 B2 | 8/2004 | Fairchild | |
| 6,803,328 B2 | 10/2004 | McCullough | |
| 6,832,410 B2 | 12/2004 | Hegde | |
| 6,886,625 B1 | 5/2005 | Sagal et al. | |
| 6,891,724 B2 | 5/2005 | De Lorenzo et al. | |

(Continued)

FOREIGN PATENT DOCUMENTS

| | | |
|---|---|---|
| EP | 0272655 | 6/1988 |
| EP | 1158484 | 11/2001 |

(Continued)

*Primary Examiner* — Amare Mengistu
*Assistant Examiner* — Sarvesh J Nadkarni
(74) *Attorney, Agent, or Firm* — Meyertons, Hood, Kivlin, Kowert & Goetzel, P.C.

(57) ABSTRACT

Methods and apparatuses are disclosed that may provide graphics controllers with increased thermal granularity. The graphics controller may comprise a display memory, at least one display engine coupled to the display memory, and at least one execution unit coupled to the display memory, where the at least one execution unit may begin an idle period that varies based upon a thermal event.

24 Claims, 4 Drawing Sheets

(56) References Cited

U.S. PATENT DOCUMENTS

| | | |
|---|---|---|
| 6,896,045 B2 | 5/2005 | Panek |
| 6,956,549 B2 | 10/2005 | Naiki |
| 6,987,671 B2 | 1/2006 | Houle |
| 7,006,353 B2 | 2/2006 | Matteson |
| 7,045,885 B1 | 5/2006 | Chen et al. |
| 7,085,135 B2 | 8/2006 | Chu et al. |
| 7,119,808 B2 | 10/2006 | Gonzalez et al. |
| 7,125,433 B2 | 10/2006 | Garikipati et al. |
| 7,149,909 B2 | 12/2006 | Cui et al. |
| 7,190,585 B2 | 3/2007 | Houle |
| 7,269,015 B2 | 9/2007 | Hornung et al. |
| 7,309,287 B2 | 12/2007 | Miyamoto et al. |
| 7,382,333 B2 | 6/2008 | Chen et al. |
| 7,401,243 B2 | 7/2008 | Knepper et al. |
| 7,433,191 B2 | 10/2008 | Blanco, Jr. et al. |
| 7,440,281 B2 | 10/2008 | Bailey et al. |
| 7,451,332 B2 | 11/2008 | Culbert et al. |
| 7,454,316 B2 | 11/2008 | Bose et al. |
| 7,500,123 B2 | 3/2009 | Luong et al. |
| 7,730,336 B2 * | 6/2010 | Marinkovic et al. .......... 713/320 |
| 7,840,827 B2 | 11/2010 | Dahan et al. |
| 7,866,941 B2 | 1/2011 | Li et al. |
| 7,880,586 B2 | 2/2011 | Fagrenius et al. |
| 7,882,369 B1 | 2/2011 | Kelleher et al. |
| 8,199,155 B2 | 6/2012 | Leroy et al. |
| 2002/0093590 A1 * | 7/2002 | Hodgkiss et al. ............. 348/500 |
| 2004/0238827 A1 | 12/2004 | Takayama et al. |
| 2005/0012749 A1 * | 1/2005 | Gonzalez et al. ............. 345/522 |
| 2005/0077614 A1 | 4/2005 | Chengalva et al. |
| 2005/0099431 A1 | 5/2005 | Herbert et al. |
| 2006/0120051 A1 | 6/2006 | Macris et al. |
| 2007/0076378 A1 | 4/2007 | Blanco, Jr. et al. |
| 2007/0177367 A1 | 8/2007 | Bailey et al. |
| 2008/0030509 A1 | 2/2008 | Conroy et al. |
| 2008/0204460 A1 * | 8/2008 | Marinkovic et al. .......... 345/502 |
| 2009/0044407 A1 | 2/2009 | Blanco, Jr. et al. |
| 2009/0153528 A1 | 6/2009 | Orr |
| 2009/0284534 A1 | 11/2009 | Hendry et al. |
| 2010/0091039 A1 | 4/2010 | Marcu et al. |
| 2010/0164963 A1 | 7/2010 | Sakariya et al. |
| 2010/0164964 A1 | 7/2010 | Sakariya et al. |
| 2010/0164966 A1 | 7/2010 | Sakariya |
| 2011/0032275 A1 | 2/2011 | Marcu et al. |

FOREIGN PATENT DOCUMENTS

| | | |
|---|---|---|
| EP | 1962265 | 8/2008 |
| JP | 06006733 | 1/1994 |
| JP | 2000252667 | 9/2000 |
| JP | 200422928 | 1/2004 |
| WO | WO2005059880 | 6/2005 |

* cited by examiner

GRAPHICS CONTROLLERS WITH INCREASED THERMAL MANAGEMENT GRANULARITY

BACKGROUND OF THE INVENTION

1. Technical Field

The present invention relates generally to thermal management of electronic devices, and more particularly to graphics processors with increased thermal management granularity.

2. Background

Electronic devices are ubiquitous in society and can be found in everything from wristwatches to computers. The complexity and sophistication of these electronic devices usually increases with each generation, and as a result, newer electronic devices often consume a greater amount of power than their predecessors. As the power consumption increases, the circuitry within the electronic device may generate increasing levels of heat, which may be detrimental to the operation of the circuitry.

To exacerbate this problem, the trend in conventional electronic devices is to make each generation smaller. As a result, the temperature per unit volume coming from successive generations of electronic devices may rise to levels that are potentially hazardous to the user or the device itself. For this reason, microprocessors and other circuitry may be equipped with a heat sink and/or a fan to transfer heat away from the die and keep the microprocessor within safe operational ranges. Additional thermal management techniques also may be implemented such as selectively shutting down especially power-consumptive elements of an electronic device.

In addition to having increased power consumption, many conventional electronic devices also have greater graphics abilities than their predecessors. This is especially true of personal computers where users may employ multiple monitors per computer, each of which may be capable of rendering complex computer graphic images. Unfortunately, many conventional computers' thermal management techniques may offer a limited amount of control over the power consumption state of the computer's graphics sub-system. For example, techniques to control the power consumption of a graphics controller may include only a handful of power consumption states, each with varying frequency and voltage levels for the graphics controller. Often the difference in the graphics controller's performance in each of these power states may be too large to be useful. Further, implementing conventional power states may cause distortion to the images being painted by the computer's graphics sub-system.

Accordingly, there is a need for providing thermal management to graphics controllers that may allow improved granularity between power states.

SUMMARY

Methods and apparatuses are disclosed that may provide graphics controllers with increased thermal granularity. The graphics controller may comprise a display memory, at least one display engine coupled to the display memory, and at least one execution unit coupled to the display memory, where the at least one execution unit may begin an idle period that varies based upon a thermal event.

In some embodiments, the methods of operating the graphics controller may include detecting at least one thermal event in a computer system, determining if the computer system is operating within its thermal capacity, and in the event that the computer system is not operating within its thermal capacity, extending an idle period.

Still other embodiments may include a central processing unit (CPU), a graphics controller coupled to the CPU, a memory coupled to the graphics controller, where at least a portion of the memory may include video data, at least one display coupled to the graphics controller, a display controller coupled to the memory, where the display controller may paint the video data to the display, and a thermal regulator, wherein the thermal regulator may cause an idle signal to be asserted, and where the idle signal may be synchronized with a display period of the display controller.

BRIEF DESCRIPTION OF THE DRAWINGS

The use of the same reference numerals in different drawings indicates similar or identical items.

DETAILED DESCRIPTION OF THE INVENTION

The following discussion describes various embodiments that provide increased thermal management granularity to a graphics controller. Conventional graphics controllers may include a beam synchronization operation that may allow the graphics controller to coordinate writing to the display memory while data from the display memory is being painted to the display. These beam synchronization operations may track the progress of image data as it is read from the display memory and written to the display on a line-by-line basis. Certain portions of conventional graphics controllers also may include the ability to enter a low power mode during these beam synchronization operations once the graphics controller has finished writing to the display memory. Some embodiments may utilize this beam synchronization signal to cause the graphics controller to enter this low power state and reduce power consumption. Since the beam synchronization may be performed on a scan line basis, the granularity of the thermal management may be improved. Further, since beam synchronization already may be implemented in conventional graphics controllers for other reasons, this increase in granularity may be implemented without additional circuitry. Also, since beam synchronization already may be implemented in conventional graphics controllers to coordinate read and write operations to and from the display memory with the painting of the display, implementing power reduction operations using beam synchronization may reduce distortion problems from implementing thermal management techniques.

Although one or more of these embodiments may be described in detail, the embodiments disclosed should not be interpreted or otherwise used as limiting the scope of the disclosure, including the claims. In addition, one skilled in the art will understand that the following description has broad application. Accordingly, the discussion of any embodiment is meant only to be exemplary and is not intended to intimate that the scope of the disclosure, including the claims, is limited to these embodiments.

Figure 1:
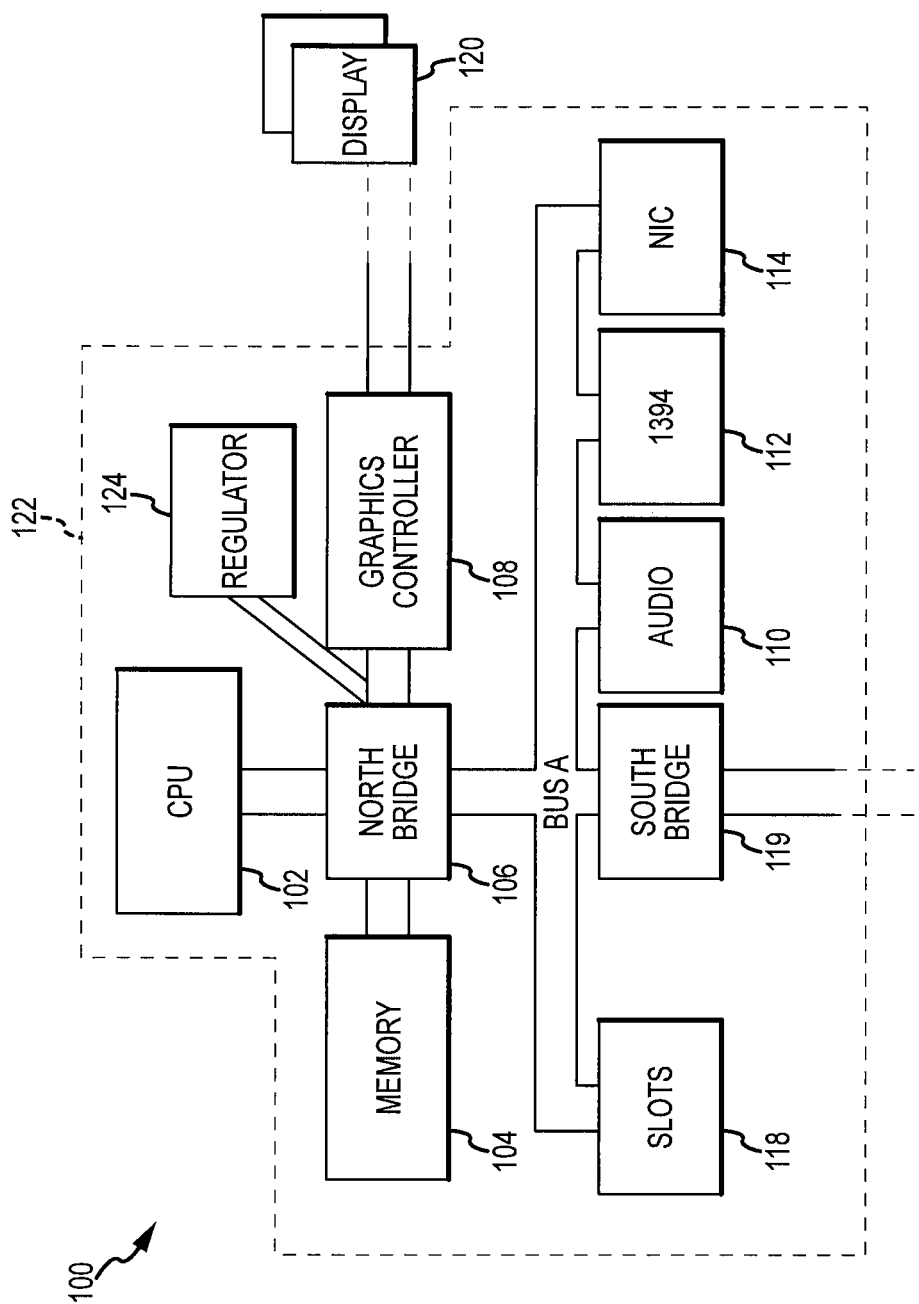
FIG. 1 illustrates an exemplary computer system.

FIG. 1 illustrates an exemplary computer system 100 that may be implemented in one embodiment. Prior to delving into the specifics of FIG. 1, it should be noted that the components listed in FIG. 1, and referred to below, are merely examples of one possible implementation. Other components, buses, and/or protocols may be used in other implementations without departing from the spirit and scope of the detailed description.

Referring now to FIG. 1, a computer system 100 includes a central processing unit (CPU) 102 that may be electrically coupled to a bridge logic device 106 by a CPU bus. The bridge logic device 106 is sometimes referred to as a "North bridge" vis-à-vis its position with respect to other systems components (such as the South bridge 119). The North bridge 106 may electrically couple to a main memory array 104 via a memory bus, and may further electrically couple to a graphics controller 108 via an advanced graphics processor (AGP) bus. In some embodiments, the graphics controller 108 may exist as a separate graphics card that is inserted into the computer 100. In other embodiments, the graphics controller 108 may be integrated within one or more integrated circuits on the motherboard of the computer 100. Because of the increasingly complex graphics demands of conventional computer systems, the graphics controller 108 may be one of the more power hungry components within the computer system 100.

The North bridge 106 also may couple the CPU 102, the memory 104, and the graphics controller 108 to the other peripheral devices in the system through, for example, a primary expansion bus (BUS A) such as a PCI bus or an EISA bus. Various components that operate using the bus protocol of BUS A may reside on this bus, such as an audio device 110, an IEEE 1394 interface device 112, and a network interface card (NIC) 114. These components may be integrated onto the PCB, or they may be plugged into expansion slots 118 that are connected to BUS A. If other secondary expansion buses are provided in computer system 100, another bridge logic device 119 may be used to electrically couple the primary expansion bus, BUS A, to a secondary expansion bus (not shown). As mentioned above, the bridge logic device 119 is sometimes referred to as a "South bridge" because of its position with respect to other system components.

In some embodiments, two or more of the components shown in FIG. 1 may be implemented as a single component. For example, in some embodiments, the graphics controller 108 may be integrated along with the North bridge 106 or along with any other component in the computer system 100.

The computer system 100 may couple to one or more display units 120 via the graphics controller 108. In this manner, the computer system 100 may support rendering computer generated graphic images to the display 120. In some embodiments, the display 120 may be integrated within the computer system 100, such as in the case of a laptop type computer system. Also, in some embodiments, the format used to convey video data to the display 120 is the digital visual interface (DVI) standard. In other embodiments, the format is the video graphics array (VGA) standard. Embodiments that include DVI and/or VGA are exemplary only, in fact, other standards and/or video standards may be used in alternative embodiments.

Figure 2:
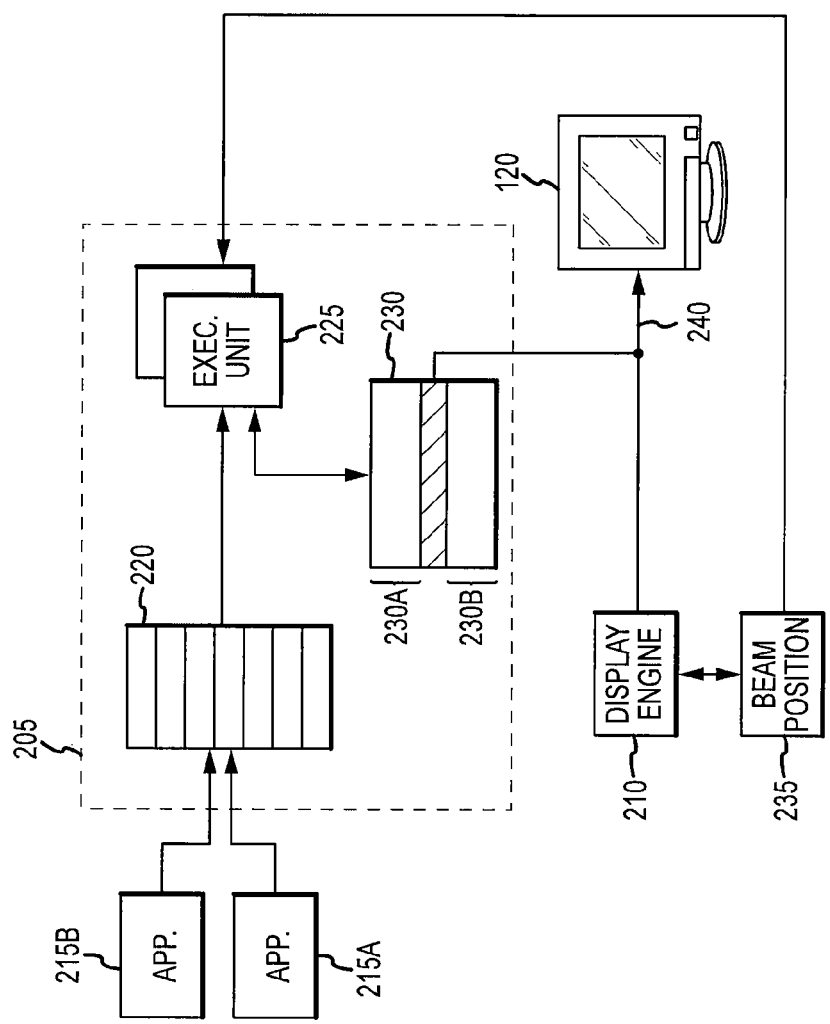
FIG. 2 depicts an exemplary graphics processing section of the computer system of FIG. 1.

FIG. 2 illustrates an exemplary implementation of the graphics controller 108. The graphics controller 108 may include a graphics processor 205 coupled to a display engine 210. During operation, one or more application programs 215A-B being executed on the computer system 100 may submit graphics processing operations to the graphics controller 108. The applications 215A-B may have varying graphics requirements. For example, in some embodiments, the application 215A may be a video game with relatively high graphics demands that change frequently, whereas the application 215B may be a word processor with relatively little graphics demands that change infrequently.

The applications 215A-B may submit their various graphics processing tasks into a work queue 220 within the graphics processor 205. One or more execution units 225 then may retrieve items submitted to the work queue 220 and execute them accordingly. The execution unit 225 may include specialized processing algorithms that perform graphics calculations more efficiently than the CPU 102 (shown in FIG. 1).

During execution of the graphics calculations, the execution unit 225 may read from and/or write to a display memory 230. In some embodiments, the display memory 230 may be the same as the main memory 104 in the computer system 100. In other embodiments, the display memory 230 may be a dedicated video memory such as a video random access memory (VRAM) that is separate from the memory 104 and located within the graphics processor 205 as shown in FIG. 2.

As the execution unit 225 fills the display memory 230 with data to be displayed on the display 120, a display engine 210 may empty data from the display memory 230 and provide it the display 120. In some embodiments, the rendered image may be stored into the display memory 230 in the order from which it will be displayed by the display 120. Regardless of whether the display 120 is a cathode ray tube (CRT), liquid crystal display (LCD), and/or plasma display, the display 120 may be segmented into a plurality of scan lines, which may be thought of as the horizontal rows of the display 120. Each of the scan lines may further comprise a plurality of picture elements, sometimes called "pixels", where each pixel is represented in the display memory 230 using one or more bits of data. Thus, the size of the display memory 230 may coincide with the maximum image size that the display 120 is capable of displaying.

During operation, data for each scan line may be read from the display memory 230 and displayed, on a line-by-line basis, by the display engine 210. The scan lines of the display 120 may be painted within a predetermined period of time referred to as the "refresh period". Generally speaking, the overall refresh period and/or refresh rate may be related to the technology used for the display 120. For example, in some embodiments, this refresh period may be 16.6 milliseconds, which may correspond to a refresh rate of 60 Hz.

As the screen of the display 120 is painted, the line-by-line progression may be tracked using a positioning circuit 235. The positioning circuit may determine which pixel of the scan line is being painted on the display 120. For legacy reasons associated with the electron beam of CRT displays, the particular pixel that the scan line is currently painting to the display 120 may be referred to as the "beam" position. Although this disclosure applies to various types of displays, including CRT and non-CRT displays, for ease of discussion, this disclosure will refer to the particular pixel that is currently being painted as the beam position. Data may be written to and read from the display memory 230 in a sequential fashion that corresponds to this beam position. For example, in some embodiments, the display memory 230 may be read in the direction of the arrow 240. Thus, there may be a portion of the display memory 230A that has been painted to the display 120 and another portion of the display memory 230B that has yet to painted to the display 120. The portion 230A may be referred to as "behind the beam" and the portion 230B may be referred to as "in front of the beam".

The positioning circuit 235 may relay the beam position back to the execution unit 225 so that the execution unit 225 may synchronize writing data to the display memory 230 with the emptying of the display memory 230. If the portion 230B (which has yet to be written to the display 120) is modified prior to being read from the display memory 230 and painted on the display 120, then the image on the display 120 may appear distorted. Specifically, if the portion 230B is written to prior to being painted on the display 120, a condition known as image "tearing" may occur where part of the image painted on the display 120 is old and part of it is new. This may be particularly noticeable when the image changes between refresh periods, such as may be the case if the applications 215A-B are video games. To overcome this tearing effect, a conventional execution unit 225 may employ a beam synchronization operation. The beam synch operation may delay the execution unit 225 from writing to the display memory 230 until the data from the display memory 230 has been read from the display memory 230 and painted to the display 120—i.e., until portion 230A represents substantially all of the display memory 230. In some embodiments, the beam synch operation may be performed on a line-by-line basis such that the overall granularity of the beam synch operation may be on a per scan line basis.

Figure 3:
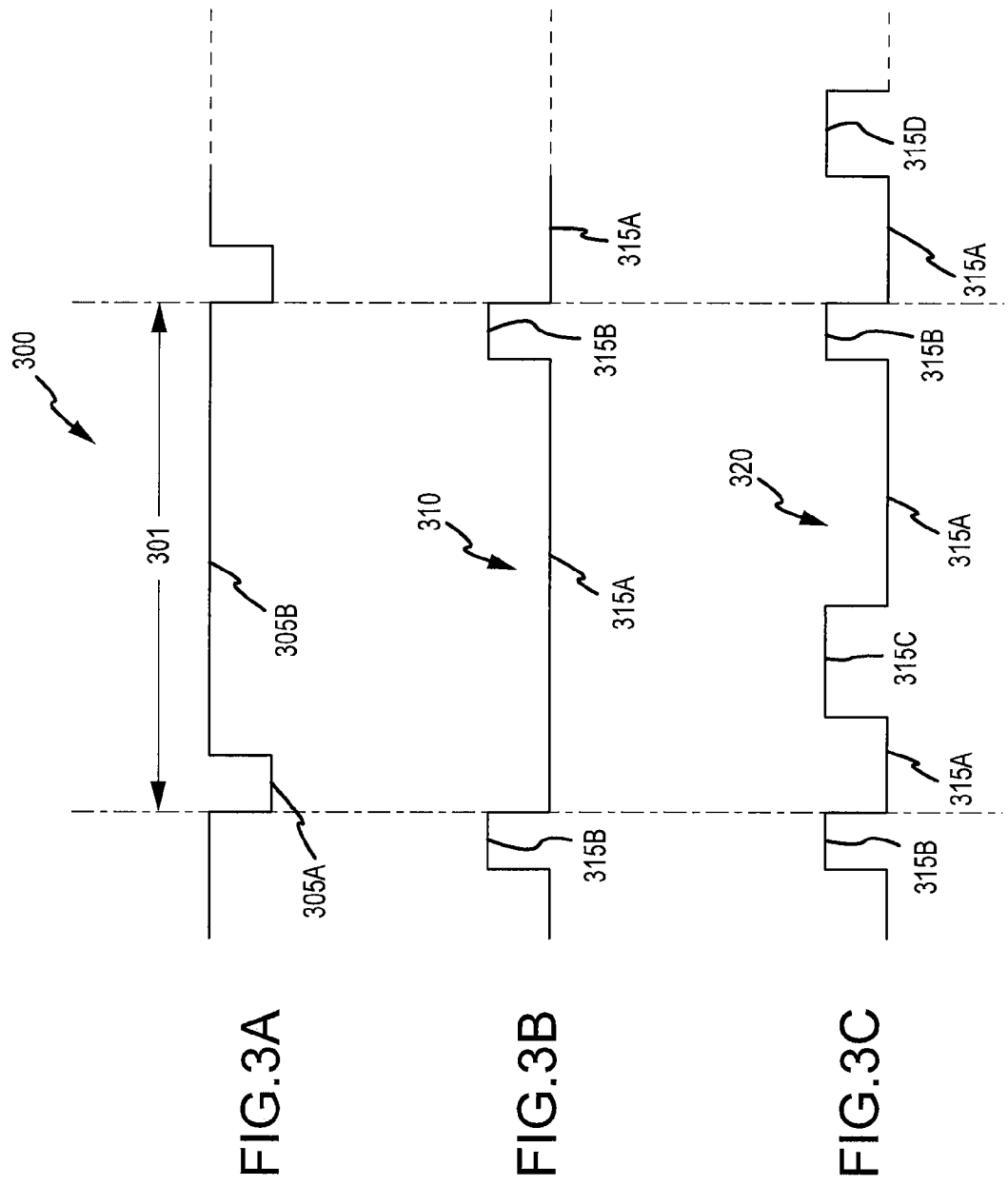
FIG. 3A illustrates an exemplary video timing signal.
FIG. 3B shows the exemplary video timing signal of FIG. 3A after power reduction measures have been implemented.
FIG. 3C illustrates additional idle periods in the exemplary video timing signal of FIG. 3A to conserve an amount of power consumed.

FIG. 3A represents a video timing waveform 300 corresponding to signals conveyed to the display 120 during a refresh period 301. The timing waveform 300 may include a blanking portion 305A and a display portion 305B During the high portion of waveform 300, a picture may be displayed on the display 120, whereas during the low portion of the waveform 300 there may be no picture being written to the display 120. In some embodiments, such as those employing a CRT, the low portion may correspond to the time taken for the electron beam to return to the top of the screen. Because the execution unit 225 may fill the display memory 230 faster than the display engine 210 may paint this information to the display 120, the execution unit 225 may be idle for at least a portion of the display period 305B. During this idle time, although the execution unit 225 may include multiple instructions to be processed, it may conserve power by deliberately not processing them while the display engine 210 continues its operations of painting the display 120.

The length of time that the execution unit 225 is idle may vary between embodiments and may vary based upon one or more thermally measured events. For example, in the event that the display 120 is implemented using CRT technology, the length of time that the execution unit 225 spends idling may be greater than other implementations (such as LCD technology) because of the time taken for the electron beam gun of a CRT to paint the screen. In some embodiments, the execution unit 225 may control the beam synch operation so as to adjust the amount of time the execution unit 225 spends idling during the display period 305B. As will be described below, this adjustment of this idling during the display period 305B may be used to conserve the amount of power that the graphics processor 205, and consequently the computer system 100, may consume.

As the graphics processors 205 and display memories 230 increase in operating frequency (which may occur with each successive generation of graphics processor 205 and/or display memory 230), the length of time it may take the execution unit 225 to write pixel data to the display memory 230 may be substantially smaller than the time taken by the display engine 210 in painting this information to the display 120. As a result, conventional graphics processors 205 may power down and/or idle the execution unit 225 during the display period 305B while the execution unit 225 is waiting for the display engine 210 to write data to the display 120. Because conventional graphics processors 205 may idle the execution unit 225 during the display period 305B, some embodiments may artificially adjust the amount of time spent idling such that the overall power consumed by the graphics processor 205 and/or the computer system 100 is reduced.

Comparing FIG. 3A to FIG. 3B, FIG. 3B illustrates an exemplary video timing waveform 310 where the execution unit 225 begins executing—i.e., it comes out of the idle. During the portion 315A, the execution unit 225 may be building a new image and may copy it the display memory 230. During portion 315B, the execution unit 225 may be waiting for a vertical blanking interval to occur.

FIG. 3C illustrates additional idle periods 315C to conserve the amount of power consumed by the graphics processor 205 and/or the computer system 100. Referring momentarily back to FIG. 1, as indicated by the dashed line, the computer system 100 may be contained within an enclosure 122 that may have a limited thermal capacity or budget. For example, in some embodiments, the thermal budget for the enclosure 122 may be 32 watts. Since many electronic devices, such as computer system 100, may be manufactured in increasingly smaller enclosures 122, the thermal budget for the device may decrease with successive product generations. This thermal budget may be monitored by a thermal regulator 124. In some embodiments, the regulator 124 may include one or more silicon based diodes (not shown), which may have temperature coefficient of approximately negative two millivolts per degree Celsius. As the temperature of the regulator 124 increases, the voltage across these diodes may decrease. Similarly, as the temperature decreases, the voltage across these diodes may increase. The power regulation circuit 124 may monitor this changing voltage to determine the operating temperature of the computer system 100. In response to this measurement, or some other temperature measurement, the portion 315A may include additional idle periods 315C to ensure that the computer system 100 does not exceed its power budget. Notably, the additional idle periods 315C may have a period that is varied based upon temperature measurement. For example, as in the waveform 320 (shown FIG. 3C) idle period 315D may have a different width than idle period 315C. As shown, this idle period 315D may vary between subsequent periods.

Figure 4:
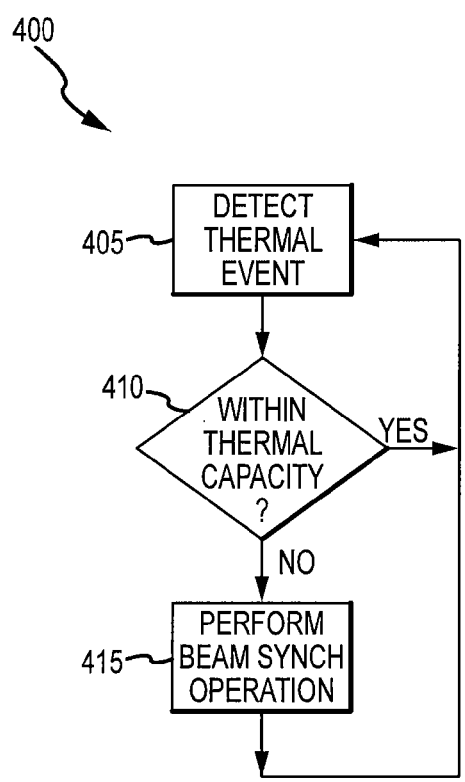
FIG. 4 shows exemplary operations that may cause power reduction.

FIG. 4 illustrates exemplary operations 400 that may be performed to reduce the power consumption of the graphics processor 205 and/or the computer system 100. In block 405, the computer system 100 may detect the occurrence of a thermal event. For example, the thermal regulator 124 may detect that the enclosure 122 has exceeded its thermal capacity. Alternatively, the thermal regulator 124 may detect that the current power consumption is approaching the thermal capacity of the enclosure 122. Next, in block 410, different action may be taken depending upon whether the computer system 100 is within its thermal capacity or if it is projected to exceed its thermal capacity. The determination as to whether the enclosure is projected to exceed its thermal capacity may be based on a variety of factors, such as heuristic power consumption measurements made during operation of the computer system 100. In the event that that computer system 100 is within its thermal capacity or is not projected to exceed its thermal capacity, then control may flow to the block 405. On the other hand, in the event that the computer system 100 exceeds its thermal capacity or is projected to exceed its thermal capacity, then the computer system 100 may perform one or more beam synch operations per block 415. Performing the beam synch operations per block 415 may result in the amount of time that the execution unit spends idling during the display period 305B being modified and/or extended as shown in the timing waveform 310.

As noted above, the beam synch operations performed during the operations 400 may be performed on a scan line by scan line basis such that the overall granularity of the reductions in the power consumption during the operations 400 may be on a scan line basis. Thus, if the display 120 has a 1440 by 900 resolution, then the graphics processor 205 may have 1440 possible different power consumption states. By contrast, conventional systems usually have significantly fewer power consumption states. For example, conventional systems may modify the overall frequency of the graphics processor 205 and the voltage of the graphics processor 205 to effectuate three different power levels: one with max frequency and voltage for full scale operation, a second with reduced frequency and reduced voltage for DVD playback, and a third where the frequency is in its lowest state for refreshing the display memory 230. Implementing beam synch operations for power consumption purposes, however, may provide numerous sub-states for each of the conventional power consumption states. Thus, it may be possible to enact one of the conventional power states and then perform beam synch operations to fine tune the power consumption of the graphics processor 205.

In addition, because the reduction in power consumption of the graphics processor 205 may be based upon conventional synchronization circuitry within the execution units 225, this power reduction scheme may be implemented without adding extra circuitry. Furthermore, because the reduction in power consumption may be based upon conventional synchronization circuitry, the power reduction may be properly synchronized to painting the display 120 without adding extra circuitry to ensure that the power reduction scheme does not interfere with normal operation, which may be the case for conventional power reduction systems.

What is claimed is:

1. A graphics controller comprising:
    a display memory;
    at least one display engine coupled to the display memory, wherein the at least one display engine is configured to transfer graphics data from the display memory to a display device; and
    at least one execution unit coupled to the display memory, wherein the at least one execution unit is configured to receive graphics processing commands sent from a host device and to generate and store the graphics data in the display memory based on the graphics processing commands;
    wherein for each scan line of an image of the display device the graphics controller is configured to determine a respective duration of an idle period of the at least one execution unit responsive to a thermal event;
    wherein, during the idle period, the at least one execution unit is further configured to:
        cease receiving additional graphics processing commands; and
        cease processing previously received graphics processing commands;
    wherein the idle period occurs between the generation of graphics data corresponding to sequential scan lines of the image;
    wherein the respective duration of the idle period of a first scan line of the image is different from the respective duration of the idle period of a second scan line of the image; and
    wherein, after the idle period, the at least one execution unit is further configured to:
        resume receiving additional graphics processing commands from the host device; and
        resume processing the received graphics processing commands.

2. The graphics controller of claim 1, wherein the at least one display engine is further configured to transfer the graphics data from the display memory to the display device while the at least one execution unit is idle during a given idle period.

3. The graphics controller of claim 1, wherein the at least one execution unit enters a low power state during at least a portion of a given idle period.

4. The graphics controller of claim 1, further comprising a work queue, coupled to the at least one execution unit, wherein the work queue is configured to store the graphics processing commands sent from the host device until the at least one execution unit retrieves the graphics processing commands.

5. The graphics controller of claim 1, wherein the thermal event is based on temperature changes of a diode junction.

6. The graphics controller of claim 1, wherein the graphics controller is housed in an enclosure and the thermal event is dependent upon a thermal budget for the enclosure.

7. The graphics controller of claim 6, wherein the thermal event is dependent upon a projection that the thermal budget for the enclosure will be exceeded.

8. A graphics controller comprising:
    a display memory;
    at least one display engine coupled to the display memory, wherein the at least one display engine is configured to transfer graphics data from the display memory to a display device; and
    at least one execution unit coupled to the display memory, wherein the at least one execution unit is configured to receive graphics processing commands sent from a host device and to generate and store the graphics data in the display memory based on the graphics processing commands;
    wherein for each scan line of an image of the display device the graphics controller is configured to determine a respective duration of an idle period of the at least one execution unit responsive to a thermal event;
    wherein, during the idle period, the at least one execution unit is further configured to:
        cease receiving additional graphics processing commands; and
        cease processing previously received graphics processing commands;
    wherein the idle period occurs between the generation of graphics data corresponding to sequential scan lines of the image;
    wherein the respective duration of the idle period of a first scan line of the image is different from the respective duration of the idle period of a second scan line of the image;
    wherein the graphics controller is further configured to cause the idle period of the at least one execution unit to be entered into responsive to one or more beam synchronization operations; and
    wherein, after the idle period, the at least one execution unit is further configured to:
        resume receiving additional graphics processing commands from the host device; and
        resume processing the received graphics processing commands.

9. The graphics controller of claim 8, further comprising a thermal management system coupled to the graphics controller wherein the thermal management system is configured to perform the one or more beam synchronization operations.

10. A method of operating a graphics controller comprising:
- detecting a temperature associated with a computer system during processing for each scan line of an image of a display;
- determining if the computer system is operating outside a predetermined thermal capacity dependent upon a given detected temperature; and
- for each scan line of the image, extending a respective duration of an idle period of one or more execution units within the graphics controller responsive to the determination that the computer system is operating outside the predetermined thermal capacity,
- wherein the idle period occurs between generation of graphics data corresponding to respective sequential scan lines of the image;
- wherein extending the respective duration of the idle period further comprises causing an idle mode of the one or more execution units to be entered into responsive to one or more beam synchronization operations;
- wherein causing the idle mode to be entered comprises ceasing, by the one or more execution units, processing of graphics commands; and
- exiting the idle mode dependent upon an end of the idle period, wherein exiting the idle mode comprises resuming, by the one or more execution units, processing of the graphics commands.

11. The method of claim 10, further comprising transferring the graphics data from the graphics controller to the display while the one or more execution units are in the idle mode during the idle period.

12. The method of claim 10, wherein at least a portion of the graphics controller enters a low power state during at least a portion of the idle period.

13. The method of claim 10, wherein determining if the computer system is operating outside the predetermined thermal capacity comprises determining if the computer system is operating outside the predetermined thermal capacity dependent upon on temperature changes of a diode junction.

14. The method of claim 10, wherein the graphics controller is housed in an enclosure and wherein determining if the computer system is operating outside the predetermined thermal capacity comprises determining if the computer system is operating outside the predetermined thermal capacity dependent upon a thermal budget for the enclosure.

15. The method of claim 14, wherein determining if the computer system is operating outside the predetermined thermal capacity comprises projecting that the thermal budget for the enclosure will be exceeded.

16. A method of operating a graphics controller:
- detecting a temperature associated with a computer system during processing for each scan line of an image of a display;
- determining if the computer system is operating outside a predetermined thermal capacity dependent upon a given detected temperature;
- for each scan line of the image, extending a respective duration of an idle period of one or more execution units within the graphics controller responsive to the determination that the computer system is operating outside the predetermined thermal capacity,
- wherein the idle period occurs between generation of graphics data corresponding to respective sequential scan lines of the image;
- wherein extending the respective duration of the idle period further comprises causing an idle mode of the one or more execution units to be entered into responsive to at least one artificially generated beam synchronization operation;
- wherein causing the idle mode to be entered comprises ceasing, by the one or more execution units, processing of graphics commands; and
- exiting the idle mode dependent upon an end of the idle period, wherein exiting the idle mode comprises resuming, by the one or more execution units, processing of the graphics commands.

17. The method of claim 16, further comprising generating the at least one artificial beam synchronization operation using a thermal management system coupled to the graphics controller.

18. A computer system comprising:
- a central processing unit (CPU);
- a graphics controller coupled to the CPU configured to process graphics commands;
- a memory coupled to the graphics controller, wherein at least a portion of the memory includes video data;
- one or more displays coupled to the graphics controller;
- a display controller coupled to the memory, wherein the display controller is configured to transfer the video data from the memory to a given one of the one or more displays; and
- a thermal regulator, wherein during processing for each scan line of a plurality of scan lines of an image of the given one of the one or more displays the thermal regulator asserts an idle signal responsive to a determination that a temperature is above a predetermined threshold, wherein the assertion of the idle signal occurs between generation of graphics data corresponding to respective sequential scan lines of the image,
- wherein the graphics controller is further configured to generate at least one artificial beam synchronization signal responsive to the idle signal from the thermal regulator; and
- wherein the graphics controller is further configured to generate the at least one artificial beam synchronization signal to correspond to at least one scan line of the plurality of scan lines of the image;
- wherein the graphics controller is further configured to enter an idle mode while the idle signal is asserted;
- wherein to enter the idle mode, the graphics controller is further configured to cease processing of graphics commands; and
- wherein the graphics controller is further configured to exit the idle mode and resume processing of the graphics commands in response to a de-assertion of the idle signal.

19. The computer system of claim 18, wherein the thermal regulator de-asserts the idle signal responsive to a thermal event.

20. The computer system of claim 19, wherein at least a portion of the graphics controller enters a low power state while the idle signal is asserted.

21. The computer system of claim 20, wherein a duration of the idle signal is determined on a per scan line basis.

22. The computer system of claim 20, wherein the low power state is entered without causing screen tearing.

23. The computer system of claim 18, wherein the computer system comprises a laptop computer.

24. The computer system of claim 18, wherein the thermal regulator asserts the idle signal dependent upon a projection that a thermal budget for an enclosure will be exceeded.

* * * * *